United States Patent [19]

Inghram et al.

[11] 4,348,150
[45] Sep. 7, 1982

[54] MOBILE CARGO HANDLING SYSTEM AND METHOD

[75] Inventors: Donald M. Inghram, Santa Clara; William B. Walker, Los Gatos, both of Calif.

[73] Assignee: FMC Corporation, Chicago, Ill.

[21] Appl. No.: 151,045

[22] Filed: May 19, 1980

[51] Int. Cl.³ .............................................. B60P 1/52
[52] U.S. Cl. .................................... 414/529; 414/536; 414/786
[58] Field of Search .................. 280/29, 80 R, 405 R, 280/789, 400, 408; 296/164, 165; 414/339, 343, 345, 349, 351, 352, 353, 529, 530, 531, 532, 533, 534, 535, 536, 507, 786

[56] References Cited
U.S. PATENT DOCUMENTS

| | | | |
|---|---|---|---|
| 2,813,727 | 11/1957 | Whalen | 280/408 |
| 3,233,761 | 2/1966 | McCartney et al. | 414/536 |
| 3,243,062 | 3/1966 | Frassetto | 414/533 |
| 3,348,859 | 10/1967 | Melbye | 280/405 R |
| 3,435,969 | 4/1969 | McCartney et al. | 414/343 X |
| 3,506,144 | 4/1970 | Carder et al. | 414/343 |
| 3,604,576 | 9/1971 | Poccard | 414/339 |
| 3,720,329 | 3/1973 | Gamble | 414/533 X |

Primary Examiner—James L. Rowland
Attorney, Agent, or Firm—A. J. Moore; R. B. Megley

[57] ABSTRACT

A mobile cargo handling system and method is provided for transferring containers relatively long distances between two locations by a steerable, self-propelled transporter which is connected to a dolly supported on swivel casters so that the longitudinal axes of the transporter and dolly are maintained parallel to a vertical plane when the system is moving along a circuitous path. The dolly includes a roller deck, and the transporter includes a powered roller deck which is selectively controlled to drive one or more containers onto and off of both roller decks.

4 Claims, 5 Drawing Figures

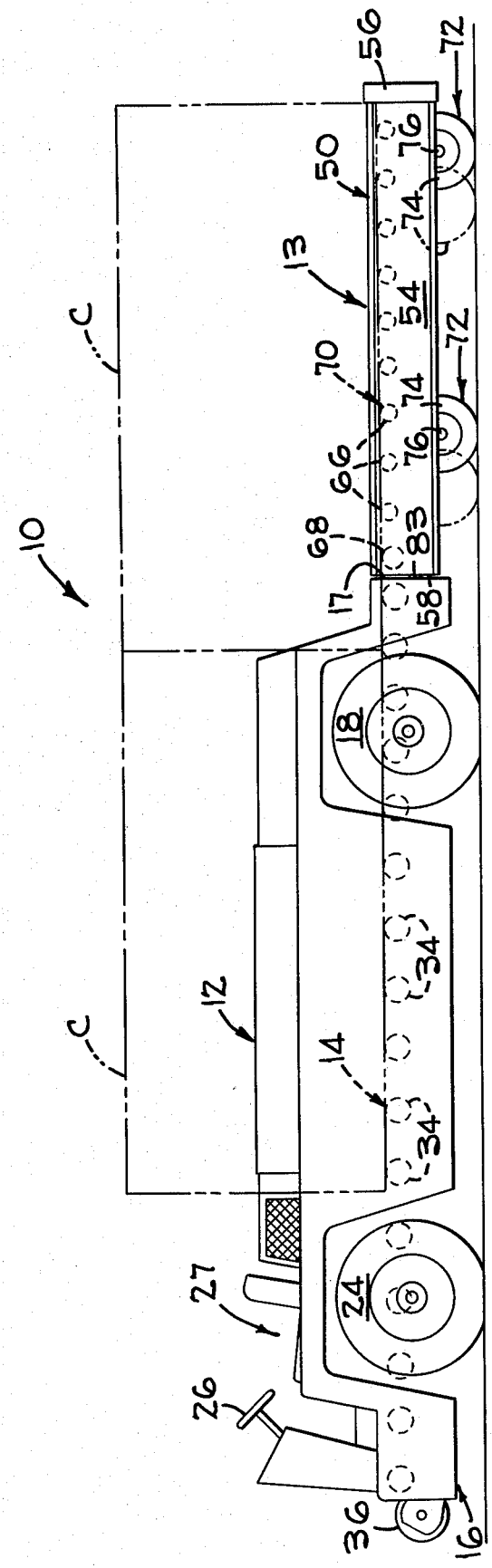
FIG_1

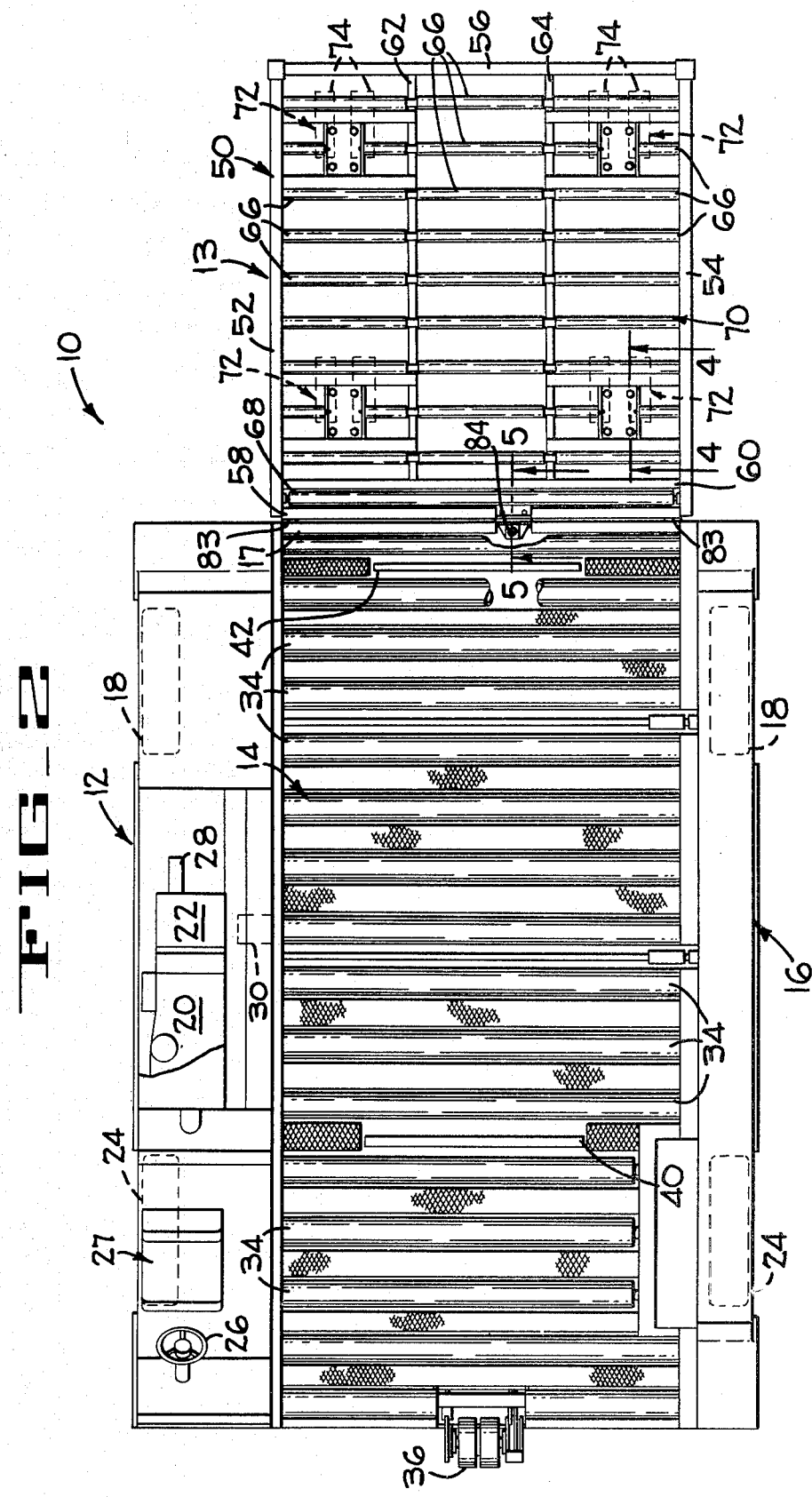

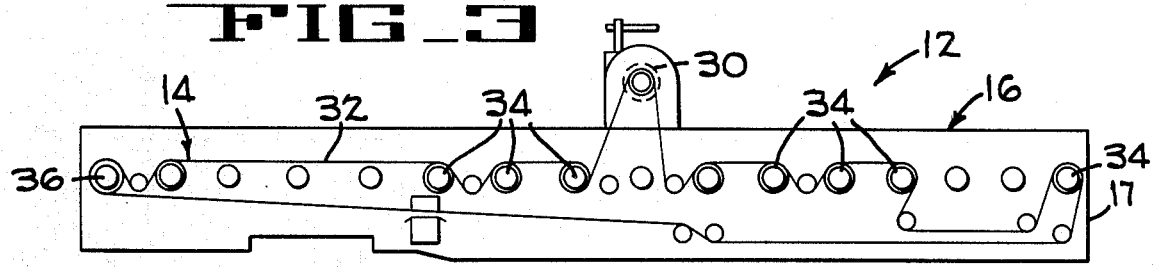
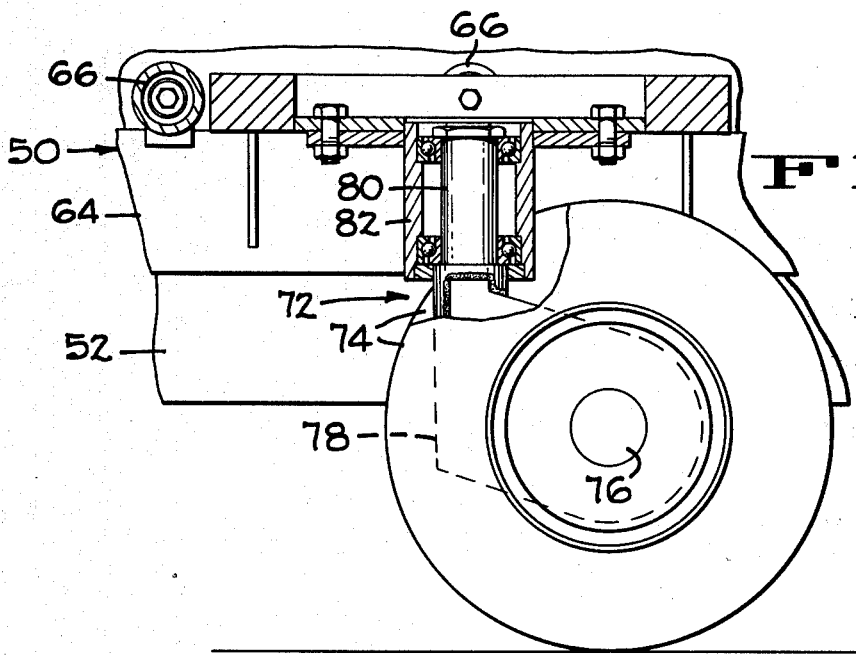
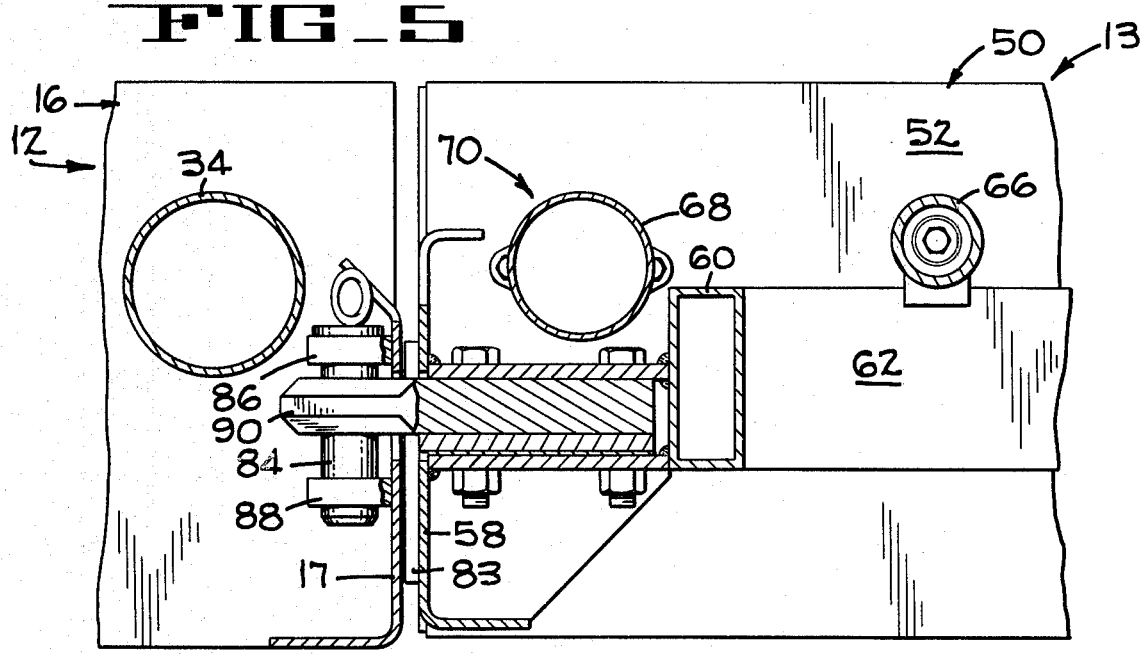

MOBILE CARGO HANDLING SYSTEM AND METHOD

BACKGROUND OF THE INVENTION

1. Field of the Invention

The present invention relates to a mobile cargo handling system and method for aircraft and ocean going vessels or the like, and more particularly relates to a transporter adapted to have a caster wheel supported dolly connected to one end thereof for handling cargo longer than the powered deck of the transporter.

2. Description of the Prior Art

Mobile cargo handling systems such as self-propelled transporters having a powered deck or roller bed for transferring cargo between two locations are well known in the art. One such transporter is disclosed in assignee's United States patent application Ser. No. 082,186 which was filed on Oct. 5, 1979 by Donald Le Duc. The disclosure of the Le Duc application is incorporated by reference herein for illustrating one of the preferred embodiments in which the cargo handling system is to be used.

Poccard U.S. Pat. No. 3,604,576 which issued on Sept. 14, 1971 discloses a self-propelled mobile transporter for sorting airmail boxes or the like. This reference discloses a steerable, self-propelled mobile transporter that is supported by four wheels. The rear end of the transporter is connected to a first two-wheel trailer at transversely spaced horizontal pivot points. The first trailer is connected to second and third trailers, respectively, by pivots. Thus, the patentee discloses a four unit transporter with the wheels of the trailing units being caster type wheels. However, the patentee does not disclose or suggest the concept of dimensioning the dolly so that a portion of all containers will be supported on the powered rollers of the transporter enabling the powered rollers of the transporter to drive the containers onto or off of the dolly and thus eliminating the requirement that the dolly have driven rollers or other driven components.

Frassetto U.S. Pat. No. 3,243,062 which issued on Mar. 29, 1966 discloses a pallet trailer or dolly having a pair of front caster wheels. However, the rear wheels are journaled only about fixed horizontal axes. The rear wheels, therefore, would not permit turning of the transporter and dolly if the front end of Frassetto's dolly was rigidly connected in abutting engagement to the rear of a transporter.

SUMMARY OF THE INVENTION

The mobile cargo handling system of the present invention includes a well known flow through transporter having a powered roller bed selectively controlled by an operator for moving containers either forwardly or rearwardly. The roller bed is carried by a chassis that is supported by four relatively large pneumatic wheel and tire assemblies, with the rear wheels being the drive wheels and the front wheels being steerable wheels. The use of large pneumatic tires makes the transporter relatively fast and maneuverable and also capable of carrying loads up relatively steep inclines such as over a ramp onto ocean going vessels.

The transporters roller bed is dimensioned to handle containers of a predetermined length, for example, ten feet long. Since many modern cargo aircraft are loaded through the nose, rather than through side doors, it frequently becomes desirable or essential to use long containers such as 20 foot containers.

In order to accommodate these longer containers (or a plurality of shorter containers), it is the gist of this invention to provide an inexpensive dolly for extending the cargo handling capacity of the transporter without impairing the maneuverability of the transporter. The dolly is provided with an unpowered or free roller bed that is supported by four swivel caster wheels and is pinned to the rear of the transporter for movement therewith. Sufficient clearance is provided in the pinned connection to permit the dolly to accommodate changes in ramp or road contour, while maintaining the front end of the dolly substantially parallel to the rear end of the transporter thereby retaining the same turning radius whether the transporter is operated alone or with the dolly attached.

BRIEF DESCRIPTION OF THE DRAWINGS

FIG. 1 is a side elevation of the cargo handling system of the present invention illustrating the transporter coupled to the dolly.

FIG. 2 is a plan view of the cargo handling system of FIG. 1.

FIG. 3 is a diagrammatic elevation illustrating the drive for the powered roller bed of the transporter.

FIG. 4 is a vertical section taken along lines 4—4 of FIG. 2, with parts cut away, illustrating one of the dolly supporting caster wheel assemblies.

FIG. 5 is a vertical section taken along lines 5—5 of FIG. 2 illustrating the front and rear walls of the dolly and transporter, respectively, and the means for connecting the dolly to the transporter.

DESCRIPTION OF THE PREFERRED EMBODIMENT

The mobile cargo handling system 10 (FIGS. 1 and 2) of the present invention is preferably used for transporting cargo such as pallets or containers C between a cargo terminal, an aircraft, or an ocean going vessel or the like.

The mobile cargo handling system 10 comprises a transporter 12 (FIGS. 1-3) for handling a short container C, while said system 10 uses the transporter 12 plus a dolly 13 connected thereto when handling two short containers or one large container.

The transporter 12 is a flow through transporter that is capable of receiving and discharging containers C (FIG. 1) from either end of a powered container supporting deck that is illustrated as a driven roller bed 14 which is supported on a chassis 16 that includes a rear wall 17. The chassis is supported by a pair of rear drive wheels 18 operatively connected to an engine 20 (FIG. 2) and transmission 22; and by a pair of steerable front wheels 24 controlled by a steering wheel 26. The wheels 18,24 are pneumatic wheels which are large enough, about 33 inches (81.8 cm) in diameter to permit movement of the loaded transporter 12 and dolly 13 up a rather steep incline. The engine 20 (FIG. 2) also drives a hydraulic pump 28 which drives a hydraulic motor 30 and a chain drive 32 (FIG. 3) that is located on the right side of the transporter 12 and is connected to and drives certain ones of full width rollers 34 that define the aforementioned driven roller bed 14 of the transporter. As indicated in FIG. 3, approximately $\frac{2}{3}$rds of the rollers 34 are driven which is sufficient to power the containers C onto or off of the transporter 12 since the several powered rollers engage and assist in driving the containers C. The usual driving and hydraulic controls are provided at the operators station 27, with selective actuation of the hydraulic controls being effective to drive the rollers 34 at different speeds and either in a clockwise or counterclockwise direction.

The transporter 12 also includes a powered retractable friction drive 36 mounted on its front end, which friction drive when needed is projected to the illustrated position to frictionally engage the roller of an unpowered but drivingly interconnected roller bed at a storage terminal (not shown) or on a trailer (not shown). The friction drive 36 is fully disclosed and claimed per se in the previously mentioned Le Duc application.

The transporters roller bed 14 also includes a forward stop mechanism 40 (FIG. 2) and a rear stop mechanism 42, which mechanisms are selectively raised or lowered in response to operation of hydraulic control means (not shown) by an operator. When the stops 40,42 are lowered below the cargo supporting plane of the roller bed 14, a container C or containers C,C (FIG. 1) may be moved onto or off of the transporter 12. When the stops are raised above the level of the roller bed 14, the stops will prevent movement of the containers onto or off the bed 14 and also will permit the transporter to be driven up or down grades without fear of the cargo rolling off the bed. If a container is positioned above one of the stops 40,42 when the operator attempts to raise the stop, a spring (not shown) between the stop and its actuating cylinder will prevent raising of the stop.

In the illustrated preferred embodiment of the transporter 12, the overall length of the transporter is about 17 feet (5.1 m); the distance between the stops 40,42 is about 10¾ feet (3.25 m); and the width of the cargo supporting roller bed 14 is in excess of 8 feet (2.5 m). Thus, the transporter 12, when operated alone, is limited to containers C that are approximately 10 feet (3.05 m) long with several inches being provided for clearance.

In order to increase the capacity of the transporter to handle 20 foot containers with a minimum of cost, without requiring additional controls, and without adversely affecting the maneuverability of the transporter, the dolly 13 is coupled to the transporter.

The dolly 13 comprises a chassis 50 including side walls 52,54, a rear wall 56, a front wall 58, a transversely extending box beam 60 (FIG. 5) near the front wall, and a pair of longitudinally extending roller supporting beams 62,64 (FIG. 2). The beams 62,64 are connected between the rear wall 56 and the box beam 60. A plurality of transversely extending small diameter rollers 66 are supported for free rotation on the chassis 50 by the side walls 52,54 and the longitudinal beams 62,64. A large diameter feed-in roller 68 is journaled to the side walls adjacent the front of the dolly to provide a more reliable feed for the container C as it is moved onto the dolly 13. The rollers 66 and 68 define a free or non-driven container supporting deck in the form of a roller bed 70. The roller bed 70 defines a container supporting surface that is disposed at a level above the front wall 58 but below the upper edges of the side walls 52,54 and rear wall 56. The rear wall 56 therefore serves as a fixed container stop which prevents movement of a container therepast.

Four free swiveling caster wheel assemblies 72 are diagrammatically illustrated in FIG. 4 and are provided for supporting the dolly 13 from the ground. Each caster wheel assembly 72 preferably includes a pair of wheels 74 journaled on a horizontal spindle 76 (FIG. 4) that is secured to a swivel body 78 having a vertical swivel shaft 80. The shaft 80 is journaled in a bearing housing 82 bolted to the chassis 50. The wheels 74 are illustrated in solid lines in FIG. 1 in their forward moving position; and in dotted lines in the position they would assume if moving in a reverse direction. Also, the spindle 76 is preferably connected to the swivel body 78 through springs (not shown) to provide a smoother ride.

The front wall 58 of the dolly 13 is provided with resilient bumpers 83 (FIGS. 1, 2 and 5) of rubber or the like near the transverse ends thereof that are moved into abutting engagement with the rear wall 17 of the transporter 14 when the dolly 13 is needed to adapt the transporter to handle longer loads. The dolly 13 is readily connected to the transporter by a pin 84 (FIG. 5) inserted in spaced apertured ears 86,88 secured to the rear wall 17 of the transporter 14 and through the apertured end of a tongue 90 that is bolted to the chassis 50 of the dolly 13 and extends forwardly through openings in the walls 17 and 58. A clearance is provided between the tongue and rear wall 17 of the transporter, as well as between the aperture in the tongue 90 and the pin 84 to permit sufficient amounts of vertical rectilinear and pivotal movement between the transporter and dolly to accommodate road contour variations.

In the illustrated preferred embodiment two 10 foot (3.05 m) containers C or one 20 foot (6.1 m) container are supported by the cargo handling system 10 when the dolly 13 is connected to the transporter 12. When the dolly is connected to the transporter, it will be appreciated that the containers (or container) C must be drawn into and be discharged from the front of the transporter 12 by the transporter's driven roller bed 14 since the rear wall 56 of the dolly 13 defines a fixed stop which prevents movement of the containers therepast.

As illustrated in FIG. 1, the front portion of the rear 10 foot container C is supported on the driven roller bed 14 of the transporter which provides the necessary power to selectively move the rear container onto and off of the dolly thus eliminating the need of any power operated components on the dolly 13.

The illustrated transporter 12 and dolly 13 when connected together are capable of handling 12.5 tons (11,350 kg) of cargo and to transport this cargo up inclines of about 8 to 12 degrees, for example between an ocean going vessel and seaport facilities.

In operation, when handling a short load of one or more containers having a length less than the length of the powered roller bed 14, the transporter 12 is preferably used alone to transport the load from one location to another. The transporter is first driven to a first location to pick up the load from a drivingly interconnected bed of rollers (not shown) such as a roller bed fixed at a terminal, a roller bed on a trailer, or a roller bed on an aircraft loader or the like. If the bed of interconnected rollers is not powered, the transporter 12 is driven into load receiving position and the retractable friction drive 36 is extended into frictional driving engagement with the bed and is driven in proper direction to move the load onto the driven roller bed 14 which then moves the containers into transport position. The stops 40 and 42 are raised to lock the load in transport position and the transporter 12 is then backed away from the roller bed and is driven to a second location where the short load is discharged from the transporter 12. The short load is preferably discharged onto another interconnected roller bed after first lowering the front stop 40. Said other roller bed may be power driven, or if not power driven, it is driven by the retractable friction drive 36 in cooperation with the transporters driven roller bed 14 to discharge the short load from the transporter 12.

If a long load of one or more containers, i.e., a load longer than the transporters driven roller bed 14, is to be handled; then the dolly 13 and the transporter are moved together and the pin 84 is dropped into coupling position with the ears 86, 80 and tongue 90. The free roller bed 70 of the dolly 13 thus defines an extension of the transporter's driven bed 14 with the transverse rollers of both beds remaining parallel to each other while connected.

The loading and unloading of the long load is the same as above described in regard to the short load. However, if more than one container makes up the long load, the rearmost container must be long enough to be partially supported on the transporter's driven roller bed when the rear end of the rearmost container abuts the rear wall 56 of the dolly 13. It will also be appreciated that the spring loaded rear stop 42 will be prevented from raising but that the front stop 40 will raise when the load is in the transport position.

The swivel caster wheel assemblies 72 which support the dolly 13 permit the transporter with dolly attached to be maneuvered through the same curves as it would traverse if the dolly was not attached.

It will be understood that the term "containers" as used in the specification and claims include cargo attached to pallets, as well as other types of cargo having lower surfaces which are capable of being maneuvered along the several roller beds.

From the foregoing description it is apparent that a cargo handling system and method is disclosed and includes a transporter and dolly extension, which extends the bed size and load handling capacity of the transporter as compared to using the transporter alone and without adversely affecting the maneuverability of the cargo handling system. Swivel caster wheel assemblies support the dolly which permit relative vertical movement between the transporter and dolly but do not permit relative horizontal movement between the dolly and transporter when connected. The roller bed of the dolly is unpowered since a portion of all containers rest on the powered roller bed of the transporter.

Although the best mode contemplated for carrying out the present invention has been herein shown and described, it will be apparent that modification and variation may be made without departing from what is regarded to be the subject matter of the invention.

What is claimed is:

1. A method of selectively transferring container loads of different lengths between two locations with a steerable self-propelled mobile transporter having a powered container supporting deck used either alone or when coupled to a dolly having an unpowered deck supported by swivel caster wheels;

when handling a first load defined by one or more containers having a total length less than the length of said powered container supporting deck, said method comprising the steps of;

driving the transporter along a path to one of said locations, receiving said first load on said powered deck, applying power to said powered deck for advancing said first load rearwardly into transport position on said deck, locking said first load in transport position, driving said transporter along a circuitous path to said other location, unlocking said first load and applying power to said powered deck for advancing said first load off said deck at said other location;

when handling a second load defined by one or more containers having a total length greater than said powered container supporting deck, said method comprising the steps of;

connecting said dolly to said transporter with the longitudinal axes of said dolly and transporter maintained parallel to a vertical plane, receiving said second load on said powered deck, applying power to said powered deck for advancing said second load rearwardly into transport position until the rear end of the rearmost container is stopped from further movement and has its forward end supported on said powered deck, locking said second load in transport position on said decks, driving said transporter and dolly along a circuitous path to said other location, unlocking said second load and applying power to said powered deck for advancing said second load off of said decks at said second location.

2. A method according to claim 1 wherein said transporter has a predetermined minimum turning radius, and wherein said minimum turning radius is the same when operating alone or when connected to said dolly.

3. A method according to claim 1 wherein said dolly when connected to said transporter is capable of vertical pivotal and rectilinear movement relative to the transporter for compensating for road contour variations and to permit movement along paths that include inclined portions.

4. An apparatus including a powered container supporting deck of predetermined length for selectively transferring container loads of different lengths between two locations:

when handling one or more containers defining a short container load having a total length less than the length of said powered container supporting deck, said apparatus comrpising:

means defining a longitudinally extending steerable self-propelled mobile transporter including said powered container supporting deck, means defining power operated container stops on said deck movable between an inoperative position out of the path of movement of the container and a container restraining position within the path of movement of the container, and controllable power means for actuating said container supporting deck for moving said short load onto said deck from said first location and off said deck at said second location after said mobile transporter has been driven to said second location and when said stops are in their inoperative positions, said controllable power means including means for raising and lowering said stops with the stops being in their container retaining position when said transporter is driven between said two locations;

when handling one or more container defining a long load having a total length greater than said powered container supporting deck, said apparatus additionally comprising:

means defining a dolly having a front and rear end and a longitudinal axis, swivel caster wheels supporting said dolly, means releasably connecting said dolly to said transporter with the longitudinal axes of said transporter and said dolly being maintained substantially parallel relative to a vertical plane, said dolly including an unpowered deck means having a container supporting surface defined solely by unpowered freely rotatable elements for supporting a portion of a long load, stop means on the rear end of said dolly being spaced from said front end of said dolly a distance less than the length of the rearmost of said one or more containers of said long load for assuring that a portion of said rearmost container is supported on said powered transporter deck when said rearmost container is contacting said dolly stop means, said power transporter deck supporting a sufficient portion of the rearmost one of said one or more containers for powering said containers onto or off of said dolly deck upon selective actuation of said controllable power means and upon moving said stops into their inactive positions.

* * * * *